(12) United States Patent
Quesada et al.

(10) Patent No.: US 12,270,495 B2
(45) Date of Patent: Apr. 8, 2025

(54) SEGMENTED GRIP RING FOR PLASTIC PIPE JOINT RESTRAINT SYSTEMS

(71) Applicant: S&B Technical Products, Inc., Fort Worth, TX (US)

(72) Inventors: Guido Quesada, Santa Ana (CR); Mark A. Weih, San Jose (CR)

(73) Assignee: S&B Technical Products, Inc., Fort Worth, TX (US)

( * ) Notice: Subject to any disclaimer, the term of this patent is extended or adjusted under 35 U.S.C. 154(b) by 0 days.

(21) Appl. No.: 18/506,595

(22) Filed: Nov. 10, 2023

(65) Prior Publication Data

US 2024/0159333 A1 May 16, 2024

Related U.S. Application Data

(60) Provisional application No. 63/425,454, filed on Nov. 15, 2022.

(51) Int. Cl.
*F16L 21/03* (2006.01)
*F16L 37/091* (2006.01)

(52) U.S. Cl.
CPC .............. *F16L 21/03* (2013.01); *F16L 37/091* (2013.01)

(58) Field of Classification Search
CPC . F16L 21/02; F16L 21/03; F16L 21/08; F16L 37/0842; F16L 37/091; F16L 37/092; F16L 37/0925; F16L 17/00; F16L 17/02; F16L 17/06; F16L 47/06; F16L 47/08; F16L 47/10; F16L 47/12
See application file for complete search history.

(56) References Cited

U.S. PATENT DOCUMENTS

| | | | | |
|---|---|---|---|---|
| 4,229,025 A | * | 10/1980 | Volgstadt | B29C 66/1142 285/423 |
| 4,712,813 A | * | 12/1987 | Passerell | F16L 33/224 285/250 |
| 5,951,058 A | * | 9/1999 | Dickinson | B29C 66/52296 285/21.2 |

(Continued)

FOREIGN PATENT DOCUMENTS

EP 2354614 A1 5/2011

OTHER PUBLICATIONS

Quesada, Guido; Conference Paper: Recent Developments in Integral Joint Restraints: Sep. 2021.

(Continued)

*Primary Examiner* — Aaron M Dunwoody
(74) *Attorney, Agent, or Firm* — Whitaker Chalk Swindle & Schwartz PLLC; Charles D. Gunter, Jr.

(57) ABSTRACT

A mechanism for restraining pipe against both internal and external forces at a pipe or fitting connection and to join and seal at least two pipes to form a pipeline featuring an improved restraint mechanism. The restraint mechanism includes a circumferential casing and a companion grip ring, both of which are received within a mating groove provided in the belled end of a female pipe. The grip ring is made up of a series of arc-shaped gripping elements which are interconnected by discrete elastomeric segments. The gripping elements are separated by gaps so that a flexible hinge region is created by the elastomeric segments between adjacent gripping elements. The elastomeric segments provide both axial and radial spring action to the assembly.

11 Claims, 9 Drawing Sheets

(56) References Cited

U.S. PATENT DOCUMENTS

| | | | | |
|---|---|---|---|---|
| 6,371,531 | B1* | 4/2002 | Robison | F16L 37/0925 |
| | | | | 285/342 |
| 7,004,511 | B2* | 2/2006 | Barron | F16L 21/08 |
| | | | | 285/342 |
| 7,284,310 | B2* | 10/2007 | Jones | F16L 37/0925 |
| | | | | 29/447 |
| 9,829,137 | B2* | 11/2017 | Kennedy, Jr. | F16L 37/52 |
| 11,112,038 | B2 | 9/2021 | Jones | |
| 11,353,148 | B2 | 6/2022 | Quesada | |
| 11,365,839 | B2 | 6/2022 | Quesada | |
| 2003/0034647 | A1* | 2/2003 | Hollingsworth | F16L 37/0925 |
| | | | | 285/423 |
| 2010/0264645 | A1* | 10/2010 | Jones | F16L 37/0925 |
| | | | | 29/447 |
| 2011/0062700 | A1* | 3/2011 | Corbett, Jr. | F16L 47/08 |
| | | | | 285/31 |
| 2013/0113208 | A1* | 5/2013 | Liao | F16L 37/0925 |
| | | | | 285/339 |
| 2014/0203552 | A1* | 7/2014 | Guzowski | F16L 37/091 |
| | | | | 285/349 |
| 2015/0152990 | A1* | 6/2015 | Lopez-Chaves | F16L 37/0845 |
| | | | | 277/609 |
| 2016/0305592 | A1* | 10/2016 | Kennedy, Jr. | F16L 37/52 |
| 2019/0331274 | A1* | 10/2019 | Quesada | F16L 37/091 |
| 2020/0041048 | A1* | 2/2020 | Jones | F16L 17/035 |
| 2022/0373117 | A1* | 11/2022 | Weih | B22F 3/24 |
| 2024/0159333 | A1* | 5/2024 | Quesada | F16L 17/032 |

OTHER PUBLICATIONS

PCT /US23/79484 filed Nov. 13, 2023 International Search Report and Written Opinion.

* cited by examiner

SEGMENTED GRIP RING FOR PLASTIC PIPE JOINT RESTRAINT SYSTEMS

BACKGROUND OF THE INVENTION

1. Field of the Invention

The present invention relates generally to sealing gaskets and sealing systems used in plastic pipelines in which a male spigot pipe section is installed within a mating female socket pipe section to form a pipe joint and, more specifically, to an improved restraint system having a specialized segmented grip ring which provides the primary restraint function.

2. Description of the Prior Art

Fluid sealing systems for plastic, fluid conveying pipes are used in a variety of industries. The pipes used in such systems are typically formed from thermoplastic materials including polyolefins and PVC. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. Various types of sealing technologies have been employed to assure the sealing integrity of the pipe joint. It is important that the sealing gasket not be dislodged during the joint make up and that the gasket not become twisted or otherwise compromised in field applications. It is also important that the gasket not extrude out of the pipe groove under various pressure conditions.

Earlier gasketed sealing systems are known in which a homogeneous rubber gasket was generally deformable, allowing it to be flexed or bent by hand, accepting inverse curvature, and inserted within a mating internal raceway formed in the female, belled pipe end. The raceway in the female pipe bell end was pre-formed using a collapsible mandrel belling tool at the pipe manufacturing facility. Various attempts have been made to ensure the integrity of such pipe joints. For example, one approach to the problem included the use of a homogeneous rubber ring with a stiffening band which was inserted into a mating groove provided on the internal diameter of the rubber ring.

In the early 1970's, a new technology was developed by Gunnar Parmann of Rieber & Son of Bergen, Norway, referred to in the industry as the "Rieber Joint." In the Rieber process, the sealing gasket is installed upon the working surface of a forming mandrel and abuts a backup collar which helps to position and retain the gasket during the subsequent belling operation. The associated thermoplastic pipe is then heated and the heated thermoplastic pipe end is forced over the mandrel and gasket. The pipe socket end is deformed by the gasket and an internal retention groove is formed in the interior of the female, socket pipe end. The pipe end is then cooled so that it retains its shape and the forming mandrel is retracted, leaving the sealing gasket fixed within the retention groove. The provision of a pre-stressed and anchored elastomeric gasket during the belling process at the pipe factory provides an improved socket end for a pipe joint with a sealing gasket which will not tend to twist or flip or otherwise allow impurities to enter the sealing zones of the joint. These features serve to increase the reliability of the joint and decrease the risk of leaks or possible failure due to abrasion or other factors. The Rieber process is described in the following issued U.S. Patents, among others: U.S. Pat. Nos. 4,120,521; 4,061,459; 4,030,872; 3,965,715; 3,929,958; 3,887,992; 3,884,612; and 3,776,682.

There are other belling processes in use today which do not utilize the Rieber technology. In certain of these processes, the socket is belled to a fully open, intermediate state. The internal components such as a seal ring and a grip ring are then dropped into place in the open bell. Once the internal components are in place, the socket is heated again and pressed so that it closes to its final shape. This general type of process has been offered by Pipelife International GMBH and Specified Fittings, Inc., among others.

By whatever belling process, in addition to the sealing function provided by the sealing gasket, a need also exists for pipe joints of the type under consideration to have a restraint function, as well. Thus, during a standard installation of a pipeline, in, for example, municipal waterworks installations, the joints between pipes and between pipes and fittings are often restrained to accommodate varying pressures as well as environmental influences. The restraint systems took various forms. For example, in one type of plastic pipe connection used in the past, the restraint mechanism is an external clamping device which is totally separated from the sealing function.

Thus, a separate mechanism must perform the sealing function. In another type of fitting connection, a gasket performs the sealing function. However, it is necessary that an external means compress the gasket by mechanical action such as T-bolts. In the past, restrained joint piping systems offered in the industry thus required a substantial amount of labor to install. Under most installation conditions, the restraining systems were cumbersome to install and represented a substantial additional effort for the contractor. As a result, these and other traditional restraining mechanisms of the prior art add considerable cost and complexity to the pipe installation as well as adding the possibility of human error depending upon the specific field conditions and applications.

In 2005, a different kind of plastic pipe sealing and restraint system was introduced into the marketplace. That system restrained the plastic pipe joints, protecting them from both internal and external forces at a pipe or fitting connection while joining and sealing consecutive pipes to form a pipeline. The restraining and sealing mechanism included an internal circumferential casing made of metal, and a companion sealing ring which were received within a mating groove provided in the interior of the belled end of a female pipe. The circumferential casing had an interior circumferential region into which a metal grip ring was installed. The sealing ring and casing were integrally located within the female, belled pipe end during belling operations. The grip ring could be installed afterward. This system is known today as the Bulldog® Sealing and Restraint System and is described in issued U.S. Pat. No. 7,284,310, issued Oct. 23, 2007, to Jones et al., and assigned to the assignee of the present invention, as well as other references.

Other sealing and restraint systems were designed for use in pipe joints which were pre-formed at the factory to have a gasket receiving raceway. After the pipe was manufactured, the seal and restraint components were installed in the raceway. For example, U.S. Pat. No. 11,353,148, entitled "Sealing and Restraint System For Joining Plastic Pipe Sections Having Pre-Formed Sockets", issued Jun. 7, 2022, to Quesada, a seating and restraint system is shown for joining the spigot and socket ends of two sections of plastic pipe to form a pipe joint. The socket pipe ends are preformed at the factory with an internal raceway which receives both a sealing ring and a companion gripping ring. The sealing ring is an elastomeric member having a periphery with a protruding ear formed at one circumferential location. The companion gripping ring is a hardened member having one opening gap in the circumference thereof. The protruding ear on the sealing ring fits within the opening gap in the gripping ring, engagement of the protruding ear within the opening gap serving to prevent extrusion of the sealing ring within the gap in the gripping ring and also limiting closure of the gripping ring after engagement of the spigot end with the socket pipe end as the pipe joint is assembled.

One limitation of the "C grip" approach is that it lacks any inherent tendency to push itself against the cone that wedges it into the spigot. The only mechanism available for this purpose is the drag from the spigot as it pulls out. Since there is a certain interference between the "C" grip and the spigot, it tends to cling onto it, but this is a relatively weak force. Thus, there are circumstances in which it becomes difficult for the grip to engage, particularly in vertical installations, in which the grip must move up towards the cone, overcoming its own weight.

Another problem with this approach is that, as the spigot slides in, it drags the grip with it, away from the cone. The grip will only return to its desired interaction with the cone when the spigot pulls out partially and drags the grip with it. Due to the clearances and dimensional tolerances required for the assembly, there is a significant "free travel" distance that the spigot must pull out before the grip makes contact with the cone and starts engaging. This free travel is undesirable, as it reduces the effective depth of engagement of the spigot into the joint and requires a partial pull-out action by the contractor to ensure that the grip engaged.

One solution currently in practice is to introduce an axial spring between the grip and the casing. This spring pushes the grip against the cone, thereby promoting engagement and eliminating the "free travel". However, this involves an additional part in the assembly, which makes it more complicated. Such springs are usually made of plastic or metal.

Another limitation of the "C" grip is that, since its OD is significantly less than the ID of the raceway in the casing, in horizontal installation it drops to the lower side of the joint, thus becoming eccentric. This eccentricity increases the risk of clash between the edge of the spigot bevel and the grip, which is undesirable. In extreme situations, due to dimensional variations, the "C" grip may become severely dislodged due to its relatively low OD, thus making the installation more difficult or impossible. When this happens, the contractor must remove the "C" grip from the joint and deform it outwards to increase its OD, with the risk of going too far and reducing the grip's interference with the spigot and its tendency to engage.

Existing axial springs indirectly help keep the grip centered by pushing it against the cone, but if the "C" grip OD is small, it may still be loose with respect to the cone and remain eccentric.

Accordingly, there is a need for axial spring action to push the grip against the cone, thereby improving its tendency to engage and eliminating "free travel", and there is also a need for further radial spring action to help the grip remain centered in relatively loose assembly scenarios.

It should be apparent from the foregoing discussion that, as alternative plastics have been introduced into the plastic piping industries, the needed characteristics of the sealing and restraint systems have changed over time, particularly where the newer PVC—O type plastics are employed for the fluid conveying pipeline.

Accordingly, there is a need for a cost-effective, easy to manufacture and use combination seal and restraint system for restraining and sealing plastic pipe against internal and external forces at a pipe joint or fitting connection and for joining and sealing at least two plastic pipes to form a continuous fluid pipeline.

Additional objects, features and advantages will be apparent in the written description which follows.

SUMMARY OF THE INVENTION

A new type restraint system is shown for use in plastic pipe systems to increase the integrity of the pipe joints when subjected to various environmental factors, as well as normally encountered internal and external operating pressures. The restraint system allows movement of the mating male pipe relative to the belled end of the female pipe in a first longitudinal direction, but which restrains movement in a second, opposite relative direction. The restraint mechanism can include a single piece, ring shaped casing. A companion segmented grip ring is installed within a circumferential interior region of the casing. The casing can be formed of a variety of materials, including various metals and various plastic or other synthetic materials.

The preferred grip ring has a plurality of discrete hard, arc-shaped gripping elements, each of which has an exterior surface and an interior surface, the interior surface having at least one row of gripping teeth, the discrete gripping elements being joined either by a continuous elastomeric ring, or by discrete elastomeric segments. Preferably, the hard, gripping elements have opposing end surfaces, each of which is separated by a gap, the gap being spanned by an elastomeric segment which acts as a flexible hinge region which supplies the restraint mechanism with both radial and axial spring action during installation and use.

The flexible hinge regions of the segmented grip ring allow the discrete hard, gripping elements to move both closer to one another and further apart from one another, whereby the gaps in the ring allow the gripping inserts to be temporarily compressed while installing the grip ring within the circumferential interior region of the casing after the casing has been integrally installed within the belled pipe end during manufacture of the female pipe. Alternatively, the grip ring can be installed in the casing before belling. In other words, the casing and grip ring are delivered as an assembly. In addition, either method of installing the segmented grip ring in the casing can also be used with open bell pipe or couplings where the casing is dropped into the open bell before it is closed around the elastomer sealing ring and casing assembly.

Each gripping insert exterior surface has a sloping profile which contacts a mating interior region of the casing, whereby contact with the exterior surface of a mating male plastic pipe causes the gripping insert to ride along the exterior male surface at an angle while the row of gripping teeth on the gripping insert internal surface engage the exterior surface of the mating male plastic pipe.

The restraint systems of the invention will also typically include a sealing ring formed as an elastomeric body, the sealing ring being integrally installed within a groove formed in a belled end of the female pipe. In one preferred form, the previously described casing has a rear wall region which is substantially perpendicular to a longitudinal axis of the female pipe, the rear wall region being in contact with the elastomeric body of the sealing ring as a mating male pipe is inserted into a mouth opening of the female plastic pipe or coupling.

Where the casing is formed of plastic, the plastic material can conveniently be a material selected from the group consisting of such materials as the polyolefins such as polyethylene, polypropylene and other common plastics, such as polyvinylchloride, ABS, PET, PBT, polyamide, their glass filled version or recycled version of such common thermoplastics. A particularly preferred plastic or synthetic type material is a glass fiber reinforced polypropylene which is reinforced with about 30% glass fiber.

The casing can also be provided with an external circumferential recess which receives a trailing region of an elastomeric dirt wiper ring. The elastomeric dirt wiper ring has a leading lip region which is contacted by the nose of the male, spigot pipe during the joint assembly for wiping the nose of dirt.

Additional objects, features and advantages will be apparent in the written description which follows.

DETAILED DESCRIPTION OF THE INVENTION

The present invention provides a plastic pipe joint restraint system which meets the foregoing described objectives. The invention described herein and the various features and advantageous details thereof are explained more fully with reference to the non-limiting examples which are illustrated in the accompanying drawing and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

Figure 1:
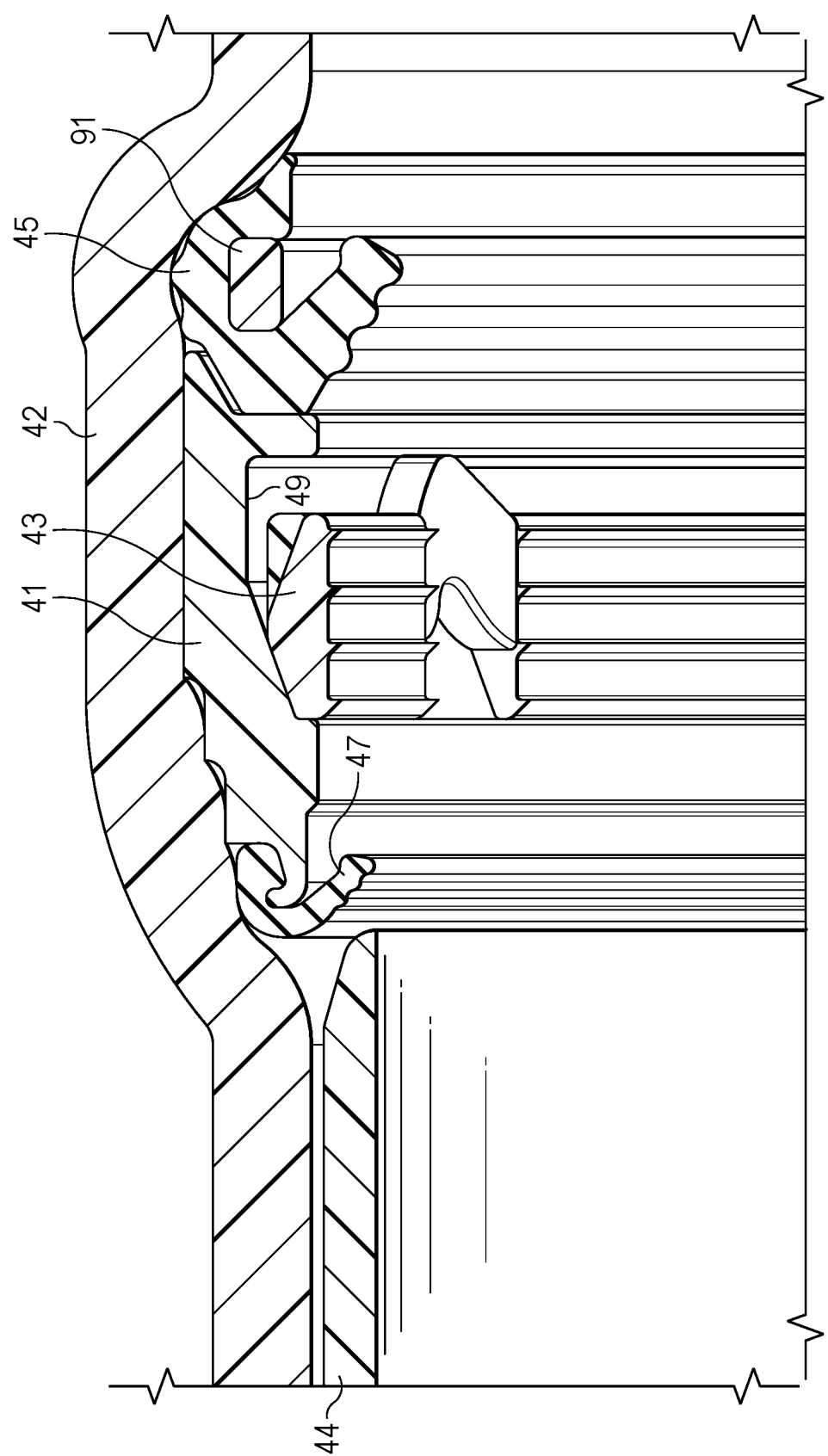
FIG. 1 is a side, partial sectional view of the restraint system of the invention showing the components thereof just prior to the male pipe end entering the female, belled pipe or coupling end.

The improved pipe restraint system of the invention will now be described. FIG. 1 is a side, partial cross-sectional view of the component parts of the inventive system. The principal components are the solid ring-shaped casing 41, the segmented grip ring 43, the sealing ring 45 and the dirt ring 47. These components are used to provide a combination seal and restraint system capable of both joining and sealing a female plastic pipe 42 to a mating male plastic pipe 44, or coupling. The plastic pipe may be formed from one of the materials customarily used in the industry, such as one of the thermoplastics, i.e., polyethylene, polypropylene, ABS, and polyvinyl chloride (PVC), where such materials have the required expansion characteristics, depending upon the end application of the pipe joint. A preferred material is PVC. More recently, "oriented" plastics, such as PVC—O have become increasingly popular.

Figure 2:
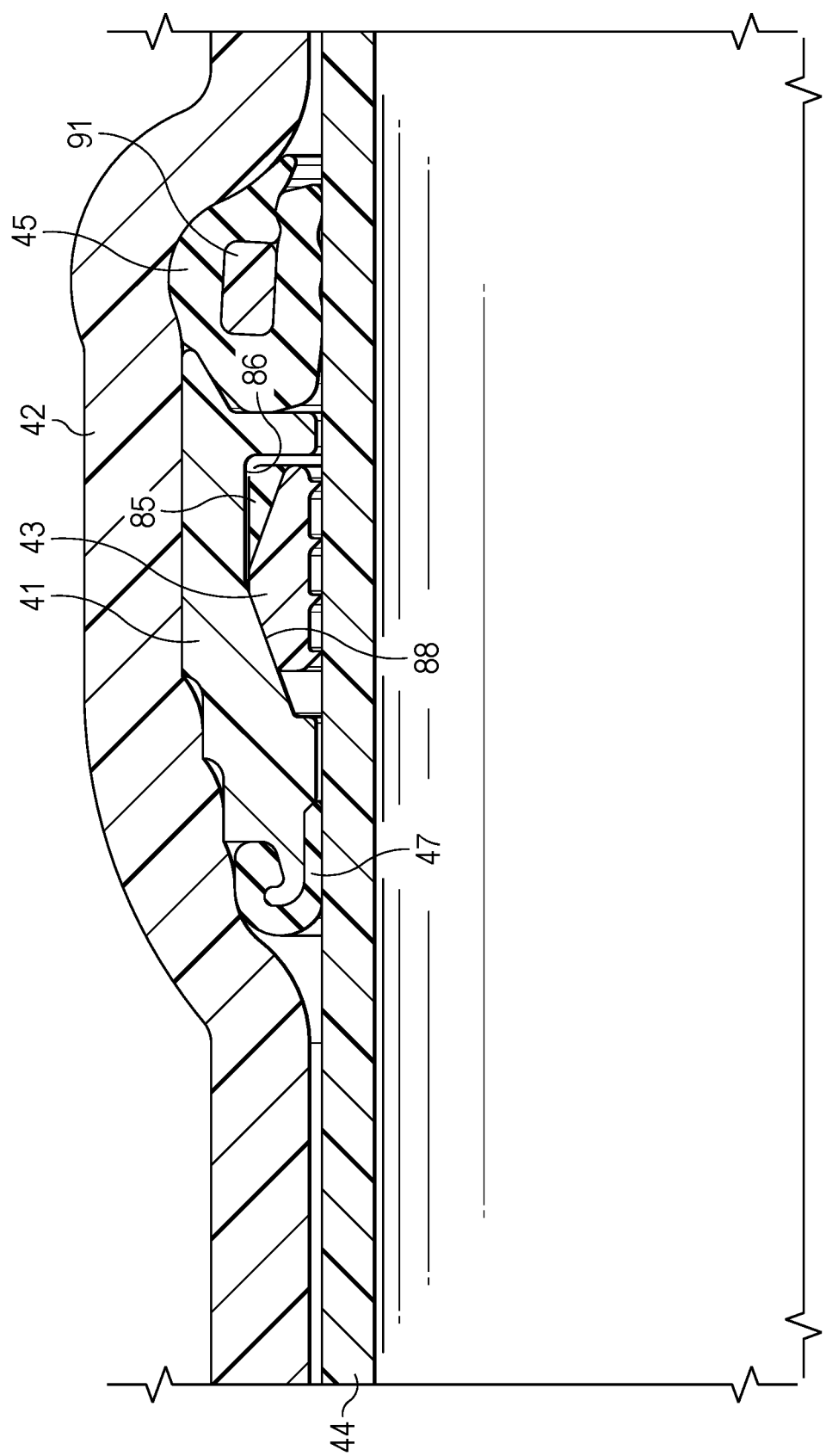
FIG. 2 is a view similar to FIG. 1, but showing the components of the restraint system after make-up of the pipe joint, or coupling.
Figure 4:
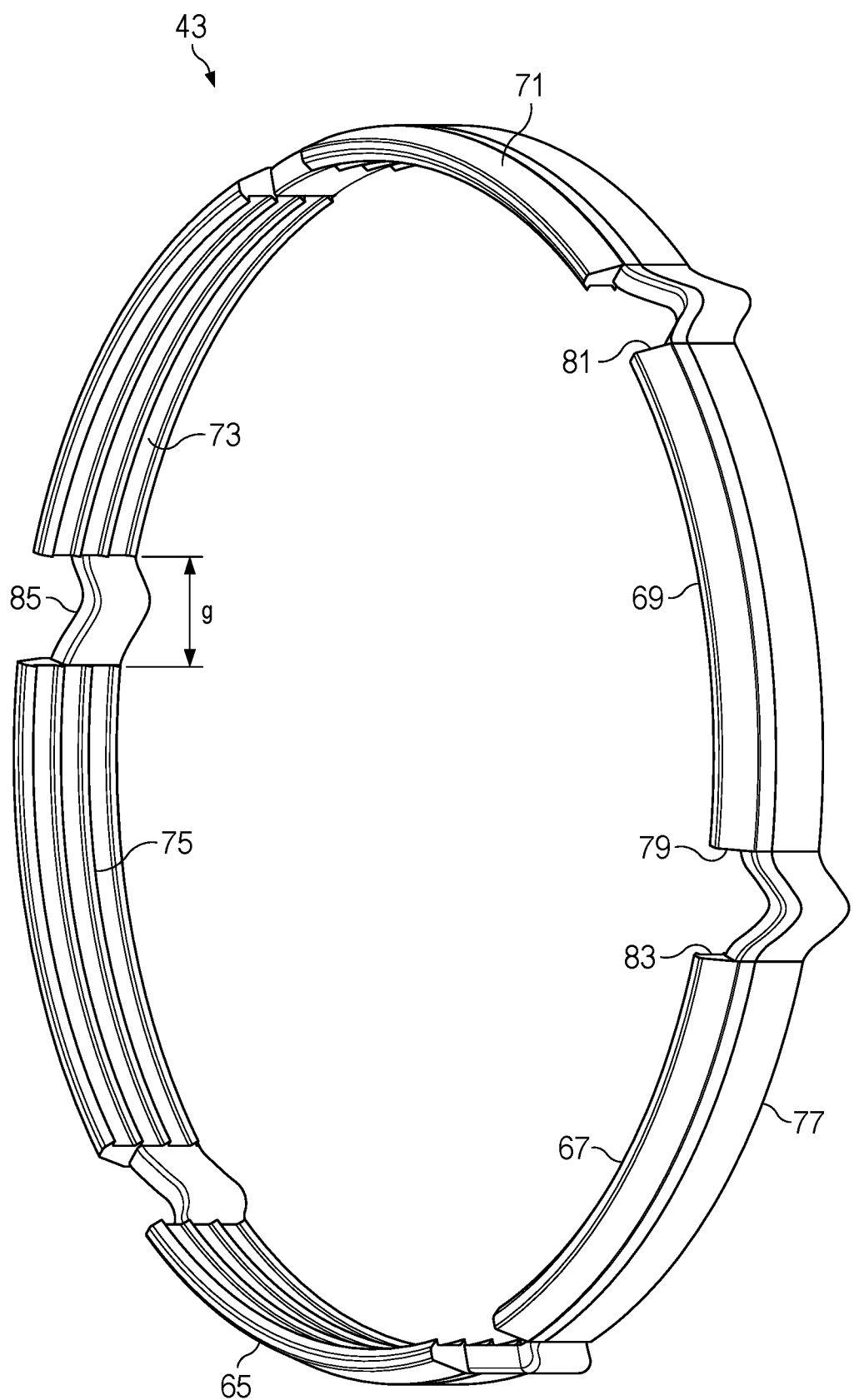
FIG. 4 is an isolated, perspective view of a preferred version of the segmented grip ring of the invention where the gripping segments are connected by discrete elastomeric segments.

With reference to FIGS. 1 and 4, the ring-shaped casing 41 of the invention preferably comprises a single piece, ring formed of a suitable metal or of a plastic which is integrally installed within the female, belled pipe end 42. The ring shaped casing 41 has a circumferential interior region (49 in FIG. 1) for receiving the companion segmented grip ring (43 in FIG. 1). The casing 41 and grip ring 43 form a companion restraint mechanism for the elastomeric sealing ring 45 which allows movement of the mating male pipe 44 relative to the belled end of the female pipe 42 in a first longitudinal direction, but which restrains movement in a second, opposite relative direction while also providing sealing integrity for the pipe joint. The components of the sealing and restraint system shown in FIG. 1 show the components before assembly. FIG. 2 shows the same components after assembly.

Figure 3:
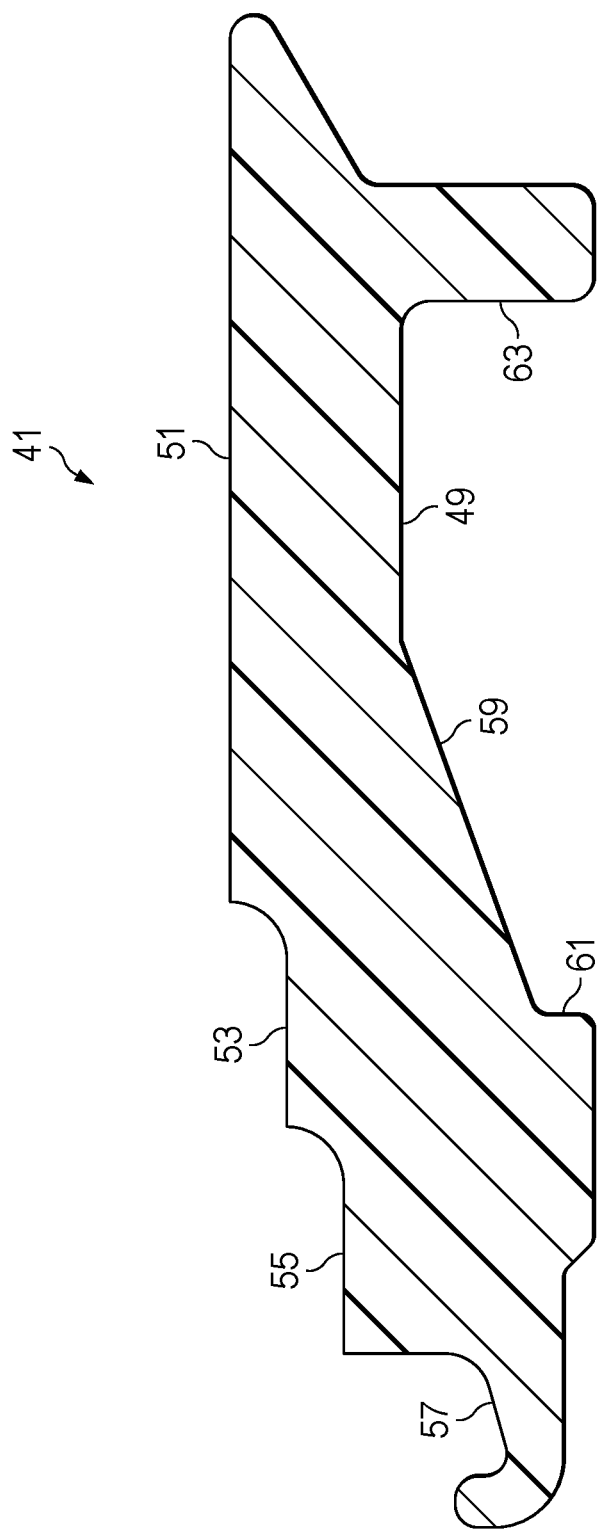
FIG. 3 is an isolated, side cross-sectional view of the casing used in the sealing and restraint system of the invention.

As perhaps best seen in the cross-sectional view of FIG. 3, the casing ring 41 has an exterior surface 51 which forms a planar region before terminating in a pair of scallop regions 53, 55, and finally in an external circumferential groove region 57. As shown in FIG. 2, the groove region 57 is designed to receive the elastomeric dirt ring 47. In addition to the circumferential interior region 49 which receives the segmented grip ring 43, the casing interior has a sloped surface 59 which terminates is a forward shoulder region 61 which serves as a forward stop for the companion grip ring. The opposite extent of the circumferential interior region 49 is bounded by an inwardly extending shoulder 63.

As briefly mentioned, the casing 41 can be formed of a suitable metal, such as stainless steel or ductile iron, or may be formed entirely of a plastic or synthetic type material, rather than being formed from metal. Candidate materials for the casing 41 would include a plastic material selected from the group consisting of such materials as the polyolefins such as polyethylene, polypropylene and other common plastics, such as polyvinylchloride, ABS, PET, PBT, polyamide, their glass filled version or recycled version of such common thermoplastics. One particularly preferred material is a glass fiber reinforced polypropylene which is reinforced with, for example, about 30% glass fiber.

The sealing ring, or gasket 45, can be formed of a resilient elastomeric or thermoplastic material. The sealing member can be formed, for example, from natural or synthetic rubber, such as SBR, or other elastomeric materials which will be familiar to those skilled in the plastic pipe arts such as EPDM or nitrile rubber. In this case, the sealing ring 45 has a hard plastic band portion 91 which serves as a reinforcing band. However, as will be apparent from the description which follows, any number of specialized sealing bands or rings can be utilized in order to optimize the sealing and restraining actions of the assembly.

The hard plastic band used with the sealing gasket can include recycled plastics, as well as a wide range of other plastics. A number of thermoplastic materials have been found to be acceptable candidates. Exemplary materials will be listed in the discussion which follows.

The companion segmented grip ring (43 in FIGS. 1 and 4) includes a plurality of discrete hard, gripping elements, such as elements 65, 67, 69 in FIG. 4. Each of these gripping elements has an arc-shaped body having an exterior surface 71 and an interior surface 73. The interior surface 73 has at least one row of gripping teeth (such as row 75 in FIG. 4). In the version of the invention shown in FIG. 4, there are actually 4 rows of gripping teeth. As can be seen in FIGS. 1 and 4, the discrete gripping elements 65, 67, 69, are joined by discrete elastomeric segments (85 in FIG. 4). As will be described more fully in the discussion which follows, the elastomeric segments 85 act as a "wave spring" in use to hold the gripping elements 65, 67, 69, in the upper beveled portion of the casing 41, allowing easier insertion without interference with the spigot. The elastomeric segments 85 also compress and fill the lower part of the casing 41, springing back when the load is released.

Figure 5:
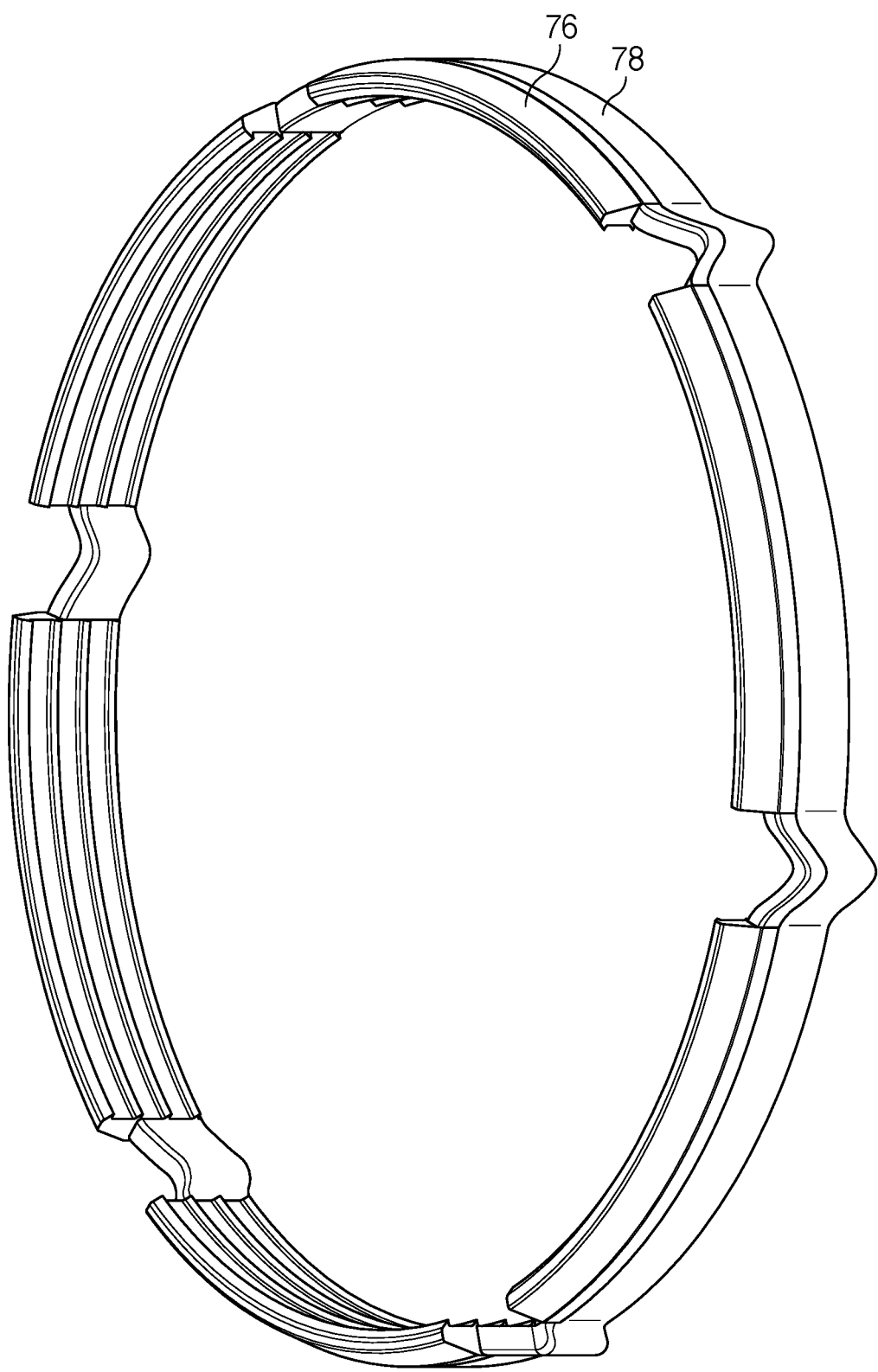
FIG. 5 is a view similar to FIG. 4, but showing another version of the segmented grip ring where the gripping segments are connected by a continuous elastomeric ring.

As an option, the gripping elements 65, 67, 69, may also be integrally formed as a part of a continuous elastomeric ring 78 during the manufacture of the elastomeric ring. For example, the elastomeric ring (78 in FIG. 5) may be injection molded with the gripping elements being integrally locked into body of the elastomeric ring during the injection molding operation. With either of the versions shown in FIGS. 4 and 5, the gripping elements may be chemically bonded to the elastomeric rubber portions. It may also be possible to glue or otherwise adhere the gripping elements to the body of the elastomeric ring 78 or to glue the elastomeric segments into the position shown in FIG. 4. As best seen in FIG. 5, in the case of the continuous elastomeric ring, the ring is received on a shelf region (generally at 76 in FIG. 5) that forms a portion of the exterior wall surface of each grip segment. As a result, more of the metal surfaces are exposed on the interior, gripping surfaces than on the exterior surfaces of the gripping segments.

In the case of the discontinuous band shown in FIG. 4, the hard, gripping elements (such as element 69) have opposing end surfaces 79, 81. The opposing end surfaces 79, 83, of adjacent elements are separated by a gap ("g" in FIG. 4). The series of spaced gaps are each spanned by the previously described elastomeric segments 85. The flexible hinge or spring regions 85 present a "Chevron" shape in the relaxed state and supply a restraint mechanism with both radial and axial spring action in use. In other words, when the segmented grip ring 43 is assembled in the casing, the flexible hinge regions allow the gripping elements to move both toward and away from each other, and up and down relative to each other, at least to a limited extent (and depending upon the stage of the make-up of the pipe joint). In this way, the gaps "g" in the ring 43 allow the gripping elements 65, 67, 69, to be temporarily compressed while installing the grip ring within the circumferential interior region 49 of the plastic casing 41 after the plastic casing 41.

The segmented gripping elements may be placed in relation to the elastomeric segments 85 so as to form two geometric arrangements:

Centered gripping elements, so that each gripping element has the intended interference with the male pipe spigot in its stress-free condition and the elastomeric segments must stretch in the circumferential direction to let the spigot in. In this case, the gripping elements fit in the casing raceway with zero nominal radial interference (+/−dimensional tolerances).

Eccentric gripping elements, so that there is about 1% radial interference with the casing raceway and the rubber must shrink to install the grip ring. The intended interference with the spigot is a result of stress-free dimensions of the grip ring and the shrinkage due to interference with the casing, so rather than stretching to let the spigot in, the rubber is pushed against the casing.

In both cases, as the assembly of the pipe joint begins, the elastomeric segments (see 85 in FIG. 2) are initially in contact with the rear wall 86 of the casing raceway, while the gripping elements 65, 67, 69, are in contact with the forwardly sloping interior region (88 in FIG. 2) of the casing. Then the elastomeric segments must deform as the spigot pushes the segments back and separates them.

The gripping elements, 65, 67, 69 in FIG. 4, are identical. The gripping elements are designed to have the same nominal curvature radius at the base of the teeth as the spigot. Therefore, in both cases, if the teeth sink completely into the spigot, the surface at the base of the teeth will match the surface of the spigot, and indentation will stop there. Further sinking of the gripping elements into the spigot would involve global deformation of the spigot, which is undesirable and is the reason for the presence of an engagement or grip stop (61 in FIG. 3), i.e., the radial wall where the front of the gripping element hits the casing and stops sliding along the conical interior surface.

There are number of differences in the two approaches, however:

In the case of the centered gripping elements, the average ID of the gripping element at the base of the teeth matches the curvature radius of the gripping elements. The lofted rubber hinges extend backwards and outwards to fill the space remaining in the casing raceway and so keep the grip ring from jiggling around. However, the nominal radial and axial interference is 0%. On average, the grip ring is just sitting there with no radial or average play. In a loose dimensional scenario the grip ring would jiggle a bit and in a tight scenario it would be slightly squeezed. It is possible that the most favorable design might involve adding some nominal axial interference, depending upon the end application.

In the case of the eccentric gripping elements, the average ID of the gripping element at the base of the teeth is larger than the equivalent curvature radius of the gripping elements. The lofted rubber hinges also extend backwards and outwards, but in this case, they do have a radial interference with the casing raceway ID. When this interference is resolved, the hinges are squeezed moderately and the ID of the grip ring is reduced, so that in this deformed installed position the gripping elements become approximately centered and their surface at the base of the teeth also match the surface of the spigot. The main difference is that in this case there is intended nominal deformation in the rubber. In a loose dimensional scenario, there would still be some interference and the grip ring would not be able to jiggle, at least in the radial direction. In a tight scenario it would be slightly more squeezed. As in the centered gripping elements, it might be desirable to add some radial interference in some cases.

As a practical matter, it may be desirable to use gripping elements, as manufactured, which end up being a mix between centered and eccentric concepts. Even if the aim is for a centered grip ring, the mold must be slightly larger to make up for rubber shrinkage, but given the usual inaccuracy in this, the intention to avoid the risk of ending up with a grip ring too small, and the likelihood of overestimating shrinkage, the most desirable solution may be to end up having some interference with the casing.

Figure 6:
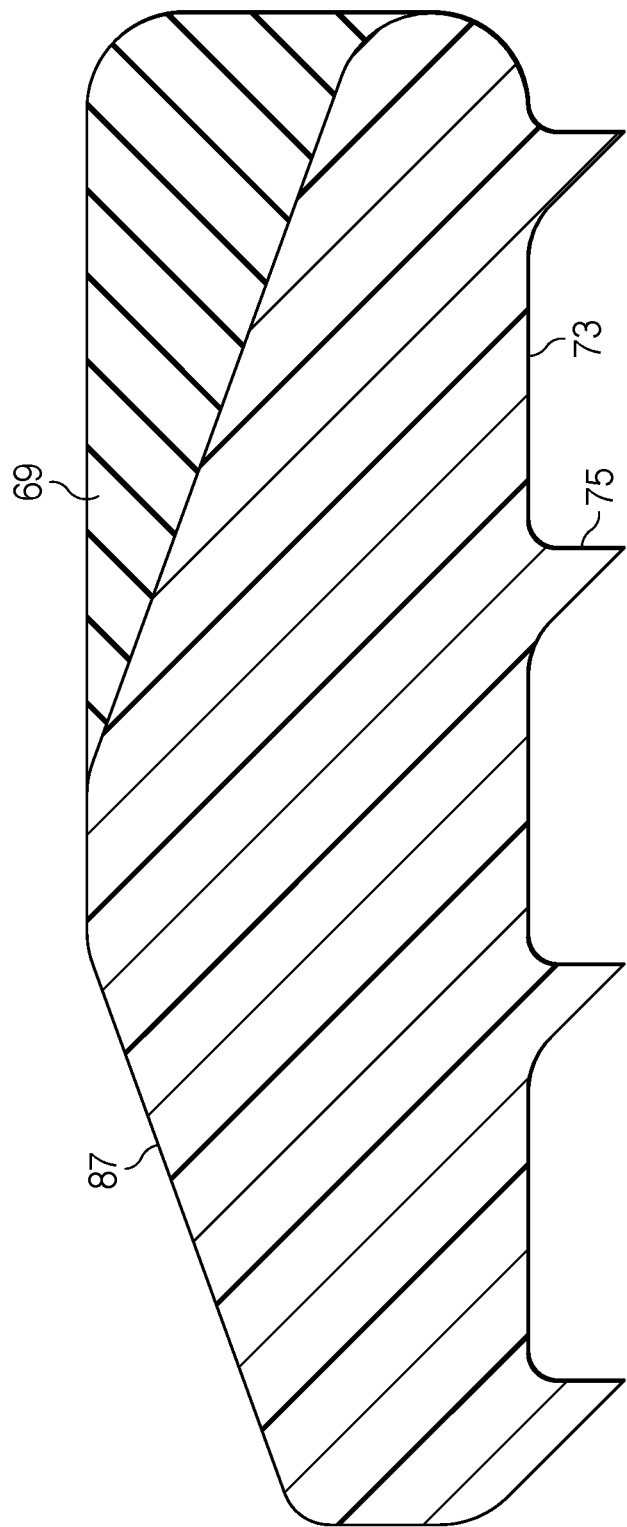
FIG. 6 is an isolated, side cross-sectional view of one of the grip segments used in the segmented gripping ring of the invention.

FIG. 6 shows one of the arc shaped gripping elements in cross-sectional fashion. As will also be appreciated with respect to FIGS. 3 and 6, each gripping element exterior surface has a forward sloping profile 87 which contacts a mating interior region (59 in FIG. 3) of the casing, whereby contact with the exterior surface of a mating male plastic pipe causes the gripping element insert to ride along the exterior male surface of the spigot 44 at an angle while the row of gripping teeth on the gripping element internal surface engage the exterior surface of the mating male plastic pipe. This movement is constrained, to some extent, by the presence of the two shoulder regions 61 and 63 of the casing 41 (see FIG. 4). Also, the casing rear shoulder 63 forms a rear wall region which is substantially perpendicular to a longitudinal axis of the female pipe. The rear wall region is also in contact with the elastomeric body (45 in FIG. 1) of the sealing ring 45 as a mating male pipe is inserted into a mouth opening of the female plastic pipe.

In the version of the invention shown in FIG. 6, the teeth rows (such as row 75 in FIG. 6) are all approximately the same height (approximately 1.2 mm in the example shown). Making the teeth the same relative height has been found to avoid the rotation sometimes observed with the use of progressive height teeth, as the teeth rest upon the spigot.

Figure 7:
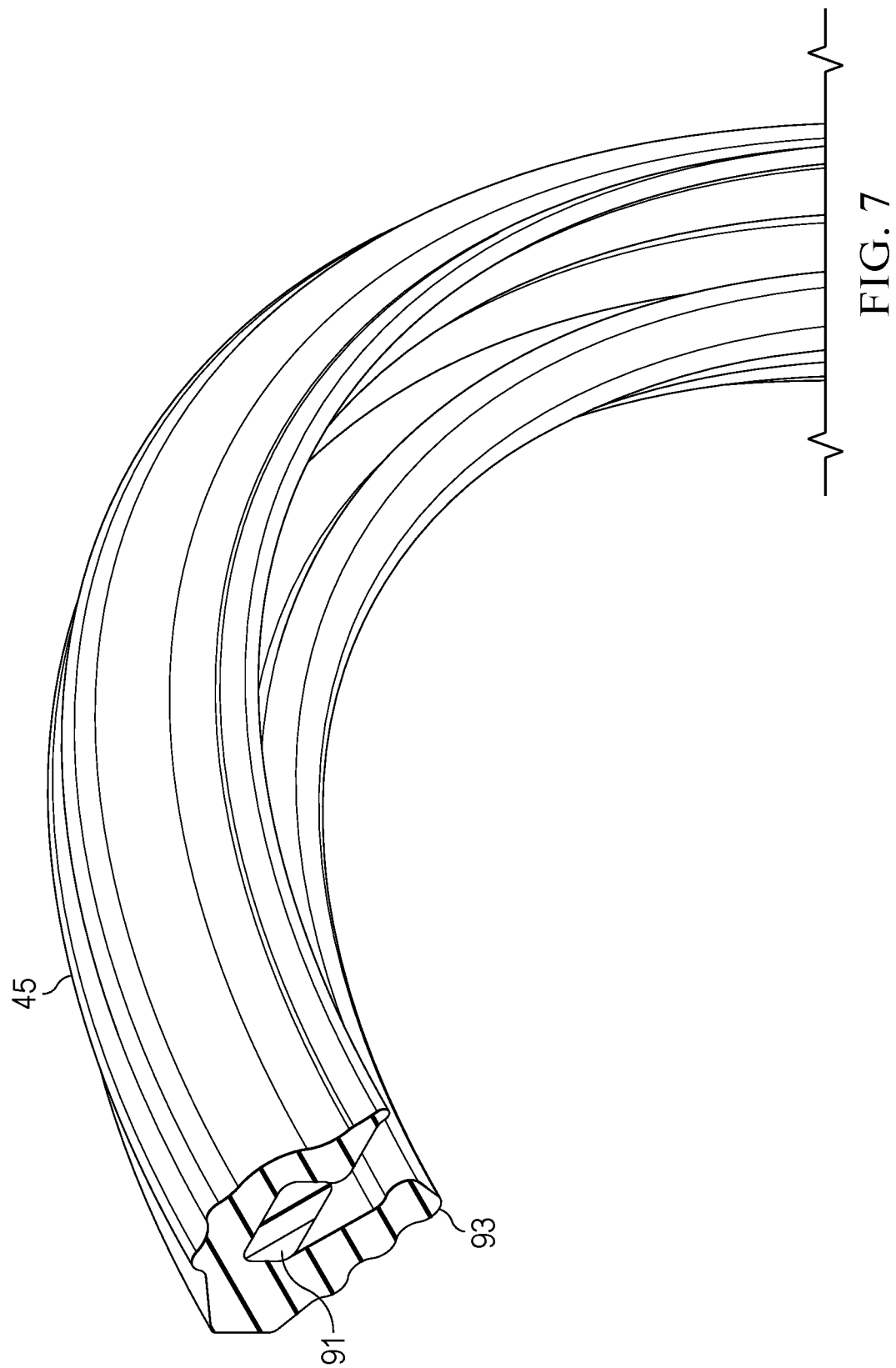
FIG. 7 is a partial, isolated view of one form of a sealing ring which can be used in the restraint system of the invention.
Figure 8:
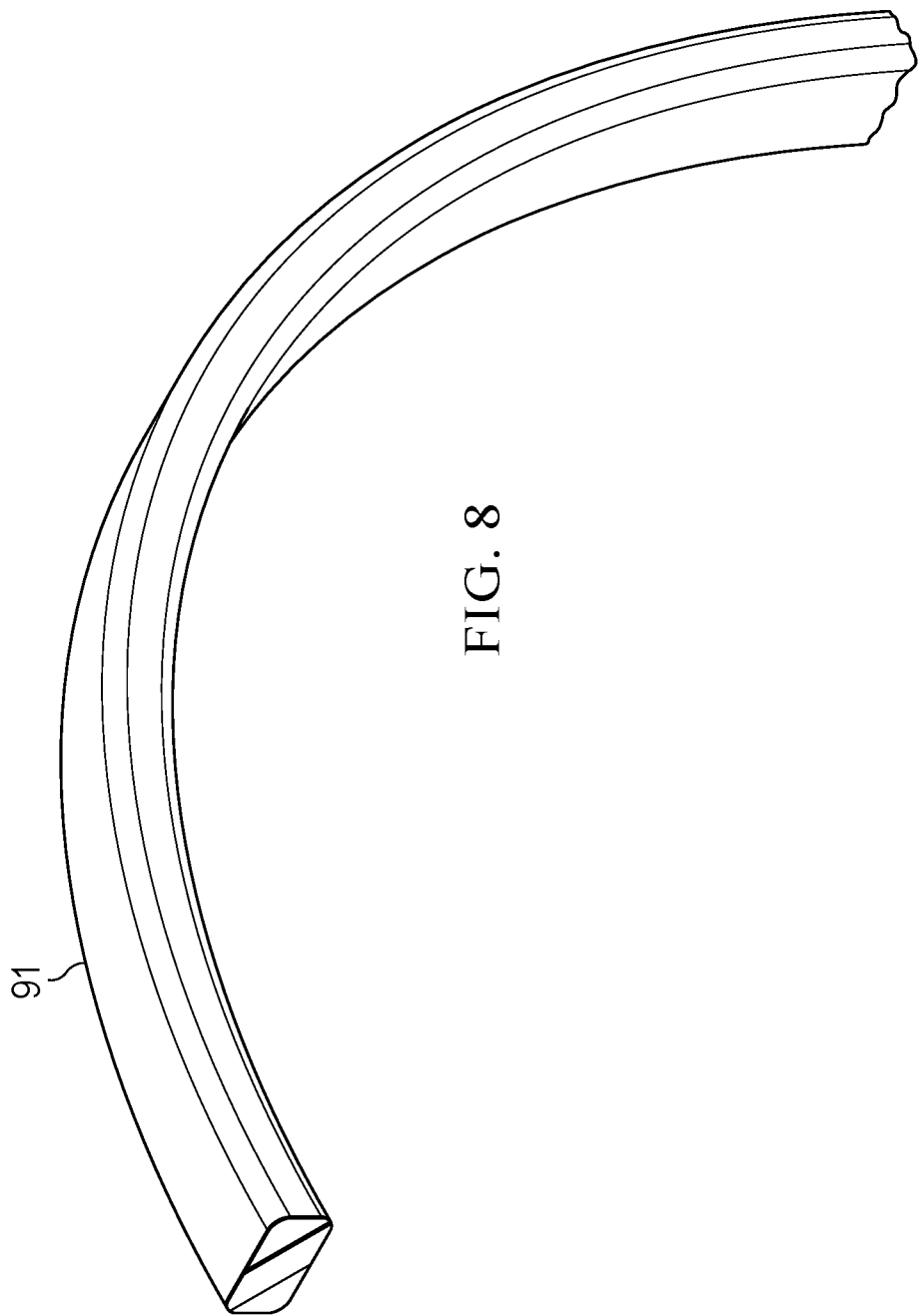
FIG. 8 is a partial, isolated view of the hard plastic band which is received within the circumferential recess formed in the sealing ring of FIG. 7.
Figure 9:
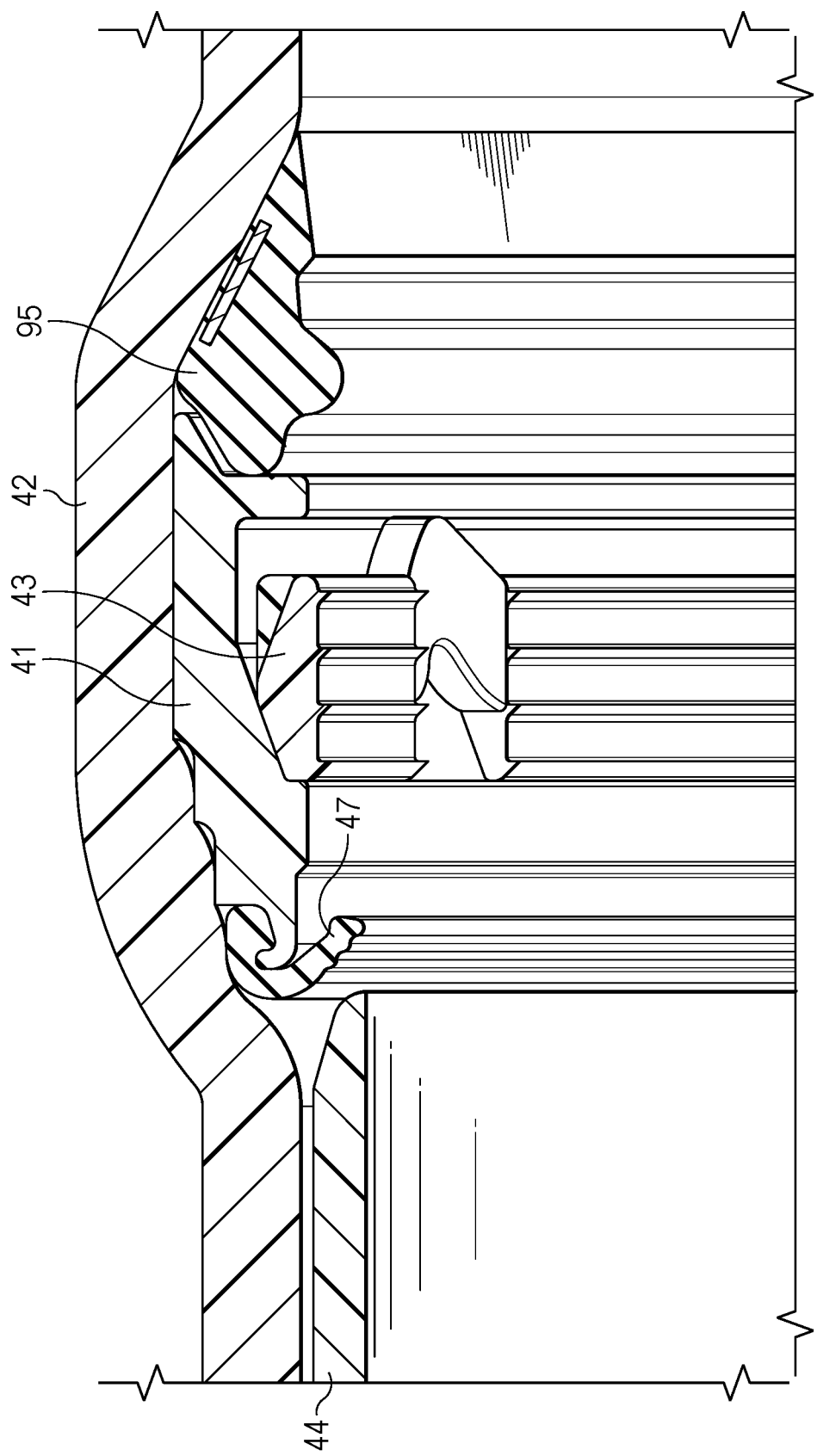
FIG. 9 shows an alternative sealing ring arrangement which could be used with the restraint system of the invention.

The sealing ring 45 is shown in partial cross-section in FIG. 7. It is an elastomeric body having an internal groove region which receives a hard plastic band 91. The downwardly extending lip region (93 in FIG. 7) makes sealing contact with the external surface of the male, spigot pipe end 41 during the assembly of the pipe joint to provide the primary sealing function for the pipe joint. The sealing ring 45 could assume any number of forms, in addition to the one illustrated in the preferred embodiment of FIGS. 1, 7 and 8. For example, the sealing ring 95 shown in the embodiment of FIG. 9 is a traditional Rieber style ring.

The sealing ring body is preferably formed of a suitable elastomer, such as a suitable natural, synthetic elastic, or TPV or TPE. The elastomeric material used to form the body 45 of the gasket will vary in composition depending upon the end application but may encompass a number of different natural and synthetic rubbers including, for example, styrene butadiene rubber (SBR), ethylene propylene diene rubber (EPDM), acrylonitrile-butadiene rubber (NBR), other nitrile rubbers, VITON or other chemically resistant material, as well as TPE's or TPV's, etc. The durometer of the elastomer used for the main gasket body may vary depending on the end application but will typically be in the range from about 40-70 Shore A hardness, preferably about 45-60 Shore A. The same type materials also form candidate materials for the dirt ring 47.

Various hard plastic type materials may be suitable candidates for use as the hard plastic band 91 of the sealing ring 95. These materials include such materials as the previously mentioned polyolefins such as polyethylene, polypropylene and other common plastics, such as polyvinylchloride, ABS, PET, PBT, polyamide, their glass filled version or recycled version of such common thermoplastics. It is not generally necessary to use a more exotic material, such as one of the various "engineered plastics," for example, the modified polyphenylene ethers (PPE), Polysulphones or Poly ethyl ether ketones (PEEK) and the like. These commercially available materials have high heat resistance, making them suitable for injection or compression molding temperatures and are generally suitable for plastic/rubber composites. However, in the process of manufacture of the invention, the rubber portion 77 and hard plastic portion 91 of the gasket are separately molded and then later joined together to form an assembled gasket. As a result, a less expensive plastic material can be used for the plastic component 91 of the gasket.

While not intended to be limiting in any sense, the following are characteristics of one set of suggested materials used in forming a prototype sealing and restraint system of the invention:

PVC for the Socket:
   Modeled as bilinear elastic-plastic up to ultimate strength, then perfectly plastic
   Elastic modulus E=2758 MPa
   Poisson's Ratio v=0.38
   Yield Strength $S_y$=48 MPa PVC—O for the Spigot:
   Modeled as bilinear elastic-plastic up to ultimate strength, then perfectly plastic
   Elastic modulus E=4000 MPa
   Poisson's Ratio v=0.38
   Yield Strength $S_y$=90 MPa Glass Fiber Reinforced Polypropylene for the Casing:
   Modeled as perfectly plastic at ultimate stress
   Elastic modulus E=6500 MPa
   Poisson's Ratio v=0.38
   Tensile Strength $S_u$=85 MPa
   Tensile Elongation $\varepsilon_u$=5%

Stainless Steel for the Grip Rings:
   Modeled at very high strength, so its behavior is mostly linear elastic
   Elastic modulus E=193,000 MPa
   Poisson's Ratio v=0.29

Rubber 55 ShA for the Sealing Ring and Dirt Ring:
   Generic hyperelastic material with Neo Hooke strain energy potential
   Modulus $C_{10}$=0.52 MPa
   Compressibility D=0.002/MPa An invention has been provided with several advantages. The present invention provides a restraint system in which the restraint mechanism is integral to the groove formed in the bell end opening of a female pipe member, or coupling. In its most preferred form, the manufacturing method and device of the invention provide an improved seal and restraint system for plastic pipe joints which does not require assembly in the field, and which thus simplifies installation of pipe sections at the pipe joints used to form a fluid conveying pipeline.

The integral restraint system of the invention eliminates the need for an external clamping device of the type presently used in the industry to achieve the restraining function, which device is totally separated from the sealing function. This eliminates the possibility of external corrosion of the metallic components of the prior art external restraints. The system of the invention is also simple in design, dependable in operation, and is less costly to manufacture than the prior art restraining systems which utilize external glands and mechanical restraint components.

Because the ring components of the restraint system of the invention can be pre-installed, the possibility of mistakes during field assembly is virtually eliminated. The segmented grip ring is also easier to install than previous versions of the C-grip shape. Also, the gripping elements of the invention apply more pressure to the exterior surface of the mating male spigot pipe end as internal pressure builds within the fluid coupling. This action helps to ensure the integrity of the joint. In addition, the gripping elements aid in sealing the joint by keeping a constant gripping pressure on the male pipe end at even the lowest operating pressures of the pipeline In addition to the axial spring action which promotes assembly, the new gripping insert of the invention also offers the advantages of:

Providing a radial spring action to keep the grip centered in loose dimensional scenarios; and Eliminating the inconvenience and potential problems caused by "free spigot travel," as well as the possibility of interference during insertion of the spigot due to lack of concentricity of the grip ring.

While the invention has been shown in only one of its forms, it is not thus limited but is susceptible to various changes and modifications without departing from the spirit thereof.

What is claimed is:

1. A plastic pipe joint restraint system capable of both joining a female plastic pipe, having at least one belled end, to a mating male plastic pipe having an interior surface and an exterior surface, the restraint system comprising:
a restraint mechanism located within a groove provided in the belled pipe end adjacent an end opening thereof which allows movement of the mating male pipe relative to the belled end of the female pipe in a first longitudinal direction but which restrains movement in a second, opposite relative direction, the restraint mechanism comprising a single piece, ring shaped casing which has a circumferential interior region and a companion segmented grip ring which is contained within the circumferential interior region of the casing;
wherein the segmented grip ring includes a plurality of hard, arc-shaped gripping elements, each of which has an exterior surface and an interior surface, the interior surface having at least one row of gripping teeth;
and wherein the hard, arc-shaped gripping elements have opposing end surfaces, each of which is separated by a gap, the gap being spanned by an elastomeric segment which acts as a flexible hinge region which supplies the restraint mechanism with both radial and axial spring action.

2. The plastic pipe joint restraint system of claim 1, further comprising:
a companion elastomeric sealing ring which is also installed within the groove formed in the belled end of the female pipe or coupling, the elastomeric sealing ring providing a sealing action for the pipe joint to thereby provide a continuous and secure fluid conduit.

3. The plastic pipe joint restraint system of claim 2, wherein the flexible hinge regions allow the discrete hard, gripping elements to move closer to one another and further apart from one another, whereby the gaps in the segmented grip ring allow the gripping inserts to be temporarily compressed while installing the segmented grip ring within the circumferential interior region of the casing.

4. The plastic pipe joint restraint system of claim 3, wherein each gripping element exterior surface has a sloping profile which contacts a mating interior region of the casing, whereby contact with the exterior surface of a mating male plastic pipe causes the gripping element to ride alone the exterior male surface at an angle while the row of gripping teeth on the gripping element internal surface engages the exterior surface of the mating male plastic pipe.

5. The plastic pipe joint restraint system of claim 4, wherein the casing has a rear wall region which is in contact with the elastomeric body of the scaling ring as a mating male pipe is inserted into a mouth opening of the female plastic pipe.

6. The plastic pipe joint restraint system of claim 5, wherein the casing is formed entirely from a metal such as stainless steel or ductile iron, or a hard plastic material selected from the group consisting of polyethylene, polypropylene, polyvinylchloride and polyamide.

7. The plastic pipe joint restraint system of claim 6, wherein the hard plastic material is a glass fiber reinforced polypropylene which is reinforced with about 30% glass fiber.

8. The plastic pipe joint restraint system of claim 7, wherein the plastic casing has an external circumferential recess which receives a lip region of an elastomeric dirt wiper ring.

9. The plastic pipe joint restraint system of claim 8, wherein in addition to the circumferential interior region which receives the segmented grip ring, the casing interior has an interior sloped surface which terminates is a forward shoulder region which serves as a forward stop for the companion grip ring.

10. The plastic pipe joint restraint system of claim 9, wherein the segmented gripping elements of the grip ring are placed in relation to the elastomeric segments in the casing so as to form geometrically centered gripping elements.

11. The plastic pipe joint restraint system of claim 9, wherein the segmented gripping elements of the grip ring are placed in relation to the elastomeric segments in the casing so as to form geometrically eccentric gripping elements.

* * * * *